US008070584B2

(12) United States Patent
Miglbauer

(10) Patent No.: US 8,070,584 B2
(45) Date of Patent: Dec. 6, 2011

(54) MATRIX GAME INVOLVING AN AWARD BASED ON NON-HIGHLIGHTED GRID POSITIONS

(75) Inventor: Hans Miglbauer, Graz (AT)

(73) Assignee: Atronic International GmbH, Lübbecke (DE)

( * ) Notice: Subject to any disclaimer, the term of this patent is extended or adjusted under 35 U.S.C. 154(b) by 403 days.

(21) Appl. No.: 12/435,217

(22) Filed: May 4, 2009

(65) Prior Publication Data

US 2010/0279758 A1 Nov. 4, 2010

(51) Int. Cl.
*A63F 9/24* (2006.01)
*G06F 17/00* (2006.01)

(52) U.S. Cl. .......................................................... 463/18

(58) Field of Classification Search ..................... 463/18
See application file for complete search history.

(56) References Cited

U.S. PATENT DOCUMENTS 5,273,281 A * 12/1993 Lovell ........................ 273/138.1
6,802,775 B2 * 10/2004 Baerlocher et al. ............. 463/16
7,300,348 B2 * 11/2007 Kaminkow et al. ............. 463/17
2006/0040721 A1 * 2/2006 Cuddy et al. ..................... 463/16
2008/0090634 A1 * 4/2008 Baerlocher ...................... 463/18
2009/0197664 A1 * 8/2009 Schultz ........................... 463/18

* cited by examiner

*Primary Examiner* — William D Coleman
(74) *Attorney, Agent, or Firm* — Patent Law Group LLP; Brian D. Ogonowsky

(57) ABSTRACT

In one embodiment, the invention is a secondary game played concurrently with a conventional Keno game. In Keno, a player selects a plurality of numbers (e.g., 4-20) within an M×N grid (e.g., 8×10) of different numbers. A random number generator randomly selects a plurality of numbers (e.g., 20) in the grid. The player is then granted a first award based on matches between numbers that the player selected and the randomly selected numbers. As a secondary game played over the Keno game, for each number randomly selected, all numbers in the same row and column in the grid as the selected number are highlighted on the grid display. The player is granted a second award (e.g., free games) for each number not being in a highlighted row or column at the end of the Keno game. Variations of the secondary game are described.

37 Claims, 7 Drawing Sheets

FOUR FREE GAMES FOR NUMBERS 25, 26, 28, AND 30 NOT BEING HIGHLIGHTED

Paytable

| Catch | Play $1 | Play $2 | Play $3 |
|---|---|---|---|
| 3 | $1 | $2 | $5 |
| 4 | $8 | $16 | $40 |
| 5 | $50 | $100 | $250 |
| 6 | $1500 | $3000 | $7500 |

FOUR FREE GAMES FOR NUMBERS 25, 26, 28, AND 30 NOT BEING HIGHLIGHTED

MATRIX GAME INVOLVING AN AWARD BASED ON NON-HIGHLIGHTED GRID POSITIONS

FIELD OF THE INVENTION

This invention relates to gaming machines or systems and, in particular, to a new type of game that may be played concurrently with a Keno game.

BACKGROUND

Keno is a popular game whose basic rules are well known. Keno is offered in most casinos. In a standard Keno game, there are 80 numbers arranged in an 8 row×10 column grid. The Keno game may be played all electronically or the player can use a paper ticket and a pen to make selections. Players pay a wager to play each game, and the award is proportional to the wager. In one type of Keno game, the player is allowed to select six numbers (called "spots") of the 80 possible numbers. After the players have made their selections, a random number generator sequentially selects a predetermined number of numbers in the grid, and these randomly selected numbers are highlighted on the grid. In one type of Keno game, 20 numbers are randomly selected. The player's numbers are compared to the randomly selected numbers for matches. Then, a pay table is consulted that equates the number of matched numbers (called "catches") with an award. There may be many pay tables depending on whether the player can select a variable number of "spots." In another type of Keno game, only six numbers are randomly selected, but the payouts are higher for a match. The pay table is calculated so that, over the long term, the casino will make a profit.

After the random selection process, the game is over, and the player must place a new wager for the next game. The player may continue to play with the same numbers or choose a new set of numbers.

The Keno game may be a stand-alone game or a bonus game in a slot machine. The Keno game may be played by a single player on an individual terminal with a small display of the grid, or the grid may be on a large display so all the players can view and play with the same grid.

Although Keno is fun and popular, it would be desirable to add a special feature to the game without changing the basic rules of the base game. Such a special feature would add more excitement and possibly bring in more revenue to the casino or game terminal.

SUMMARY

Disclosed herein is a secondary game played along with a Keno type game that does not affect the underlying conventional Keno game. One embodiment of the invention assumes a standard Keno grid of numbers, where a random number generator (either electronic or mechanical) selects a predetermined group of numbers that are highlighted on the grid as part of the conventional Keno game.

As part of the secondary game, for each number randomly selected, the row and column containing that number in the grid is highlighted (or otherwise identified). All numbers in that highlighted row and column are rendered valueless in the secondary game. The highlighted rows and columns have no affect on the underlying Keno game. As more numbers are randomly selected and the corresponding rows and columns are highlighted, many more numbers in the grid will become valueless for the secondary game. After all the numbers have been randomly selected in the Keno game, there may be one or more numbers in the grid that have not been highlighted by the row and column highlights. The player(s) participating in the secondary game receives an award based on the number of numbers not highlighted at the end of the Keno game. For example, if the numbers 4 and 40 are not highlighted at the end of the game, the players participating in the secondary game may win two free games or an award proportional the remaining numbers.

In one embodiment, the players must make an additional wager to participate in the secondary game, such as the amount wagered on the base Keno game. Any free game won will be played as if the player made the same wager as the last paid game, and the player plays the free games with the same numbers selected for the last paid game.

The mathematics of the awards granted for the secondary game are based on the likelihood of non-highlighted numbers remaining. In one embodiment, the player only wins one free game if at least one number in the grid is not highlighted at the end of the game.

The awards granted in the secondary game may be any kind of reward. If the odds of the numbers being not highlighted do not correspond to the value of a free game, monetary awards or portions of free games may be awarded.

The underlying game need not be Keno, and the secondary game may itself be the only game, where monetary awards are granted based on the remaining numbers not highlighted. The secondary game may be played as a bonus game in a slot machine.

The game may be played on an individual terminal or played using a traditional shared grid display. The players may enter their numbers directly using an electronic control or may enter their numbers using a filled-out paper ticket. The filled-out paper ticket is then inserted into an optical reader and verified by the terminal. A validated ticket is then issued by the terminal, which is valid for the respective number of games.

In a variation of the secondary game, when a number in the grid is highlighted twice (or any even number of times), the number is reactivated, and the highlighting over the number disappears. If the number is highlighted again (or any odd number of times), it becomes valueless in the secondary game. In contrast to the first embodiment, where the grid progressively becomes more and more covered by the highlighted rows and columns, this variation does not progressively highlight more and more numbers so additional opportunities for awards are continually presented.

BRIEF DESCRIPTION OF THE DRAWINGS

FIG. 8 illustrates the final grid display.

DETAILED DESCRIPTION

In one embodiment, the invention is an augmentation of any existing Keno game system, where all players share the same grid of numbers displayed on a large screen. The existing system needs to be modified to enable individual rows and columns in a number grid to be identified, such as by highlighting. In electronic Keno systems, the conventional Keno game just needs added software to carry out the secondary game. Such software is relatively simple.

The Keno type game and secondary game may also played on a gaming terminal and may even be a bonus game played after a conventional slot machine game that uses three or more virtual reels displaying symbols. Although the invention can typically be implemented by installing a software program in most types of modern video gaming machines, one particular gaming machine platform will be described in detail.

Figure 1:
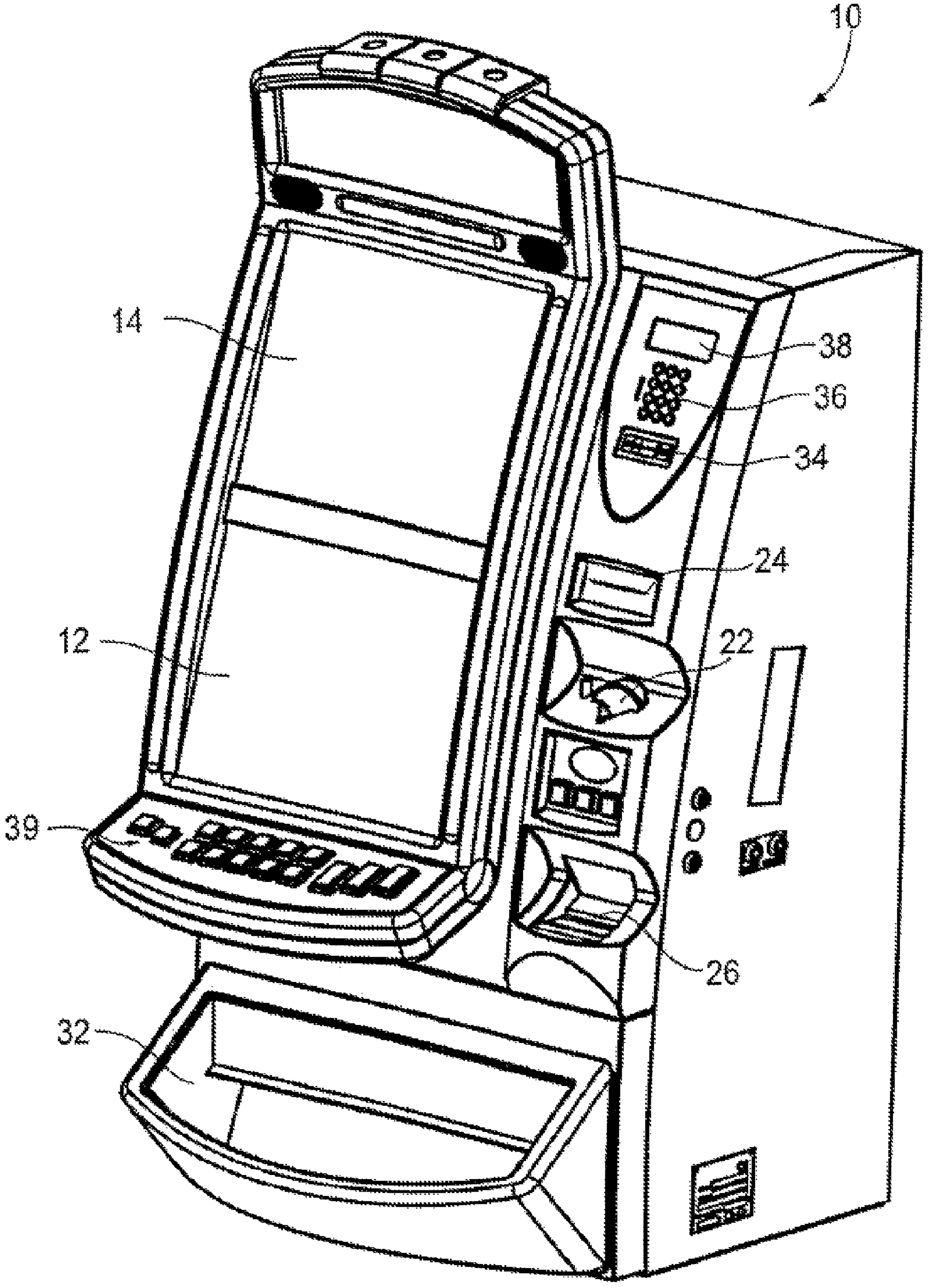
FIG. 1 is a perspective view of one type of gaming machine that may be programmed to carry out the inventive game.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide static information, such as an advertisement for the game, the rules of the game, pay tables, pay lines, or other information, or may even display the main game or a bonus game along with display 12. Alternatively, the area for display 14 may be a display glass for conveying information about the game.

Display 12 or 14 may have a touch screen lamination that includes a transparent grid of conductors. Touching the screen changes the capacitance between the conductors, and thereby the X-Y location of the touch may be determined. The processor associates this X-Y location with a function to be performed. Such touch screens are very well known in the field of slot machines, and a detailed description of them is not required. In a Keno type game, the touch screen may be used to identify the player's selection of "spots."

A coin slot 22 accepts coins or tokens in one or more denominations to generate credits within machine 10 for playing games. An input slot 24 for an optical reader and printer receives machine readable printed tickets and outputs printed tickets for use in cashless gaming. For a Keno game, the player may fill in a paper ticket by marking selected numbers and then inserting the ticket into the optical reader along with making a wager. The machine 10 then issues another ticket, showing the played numbers, the bet, and a validation code, which is valid for any number of games paid for. A bill acceptor 26 accepts various denominations of banknotes.

A coin tray 32 receives coins or tokens from a hopper upon a win or upon the player cashing out. However, the gaming machine 10 may be a gaming terminal, such as a lottery terminal, that does not pay in cash but only issues a printed ticket for cashing in elsewhere.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 39 include any buttons needed for the play of the particular game or games offered by machine 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons. For the present invention, the buttons 39 may allow the player to elect to play the secondary game by making an additional wager before the Keno type game.

Figure 2:
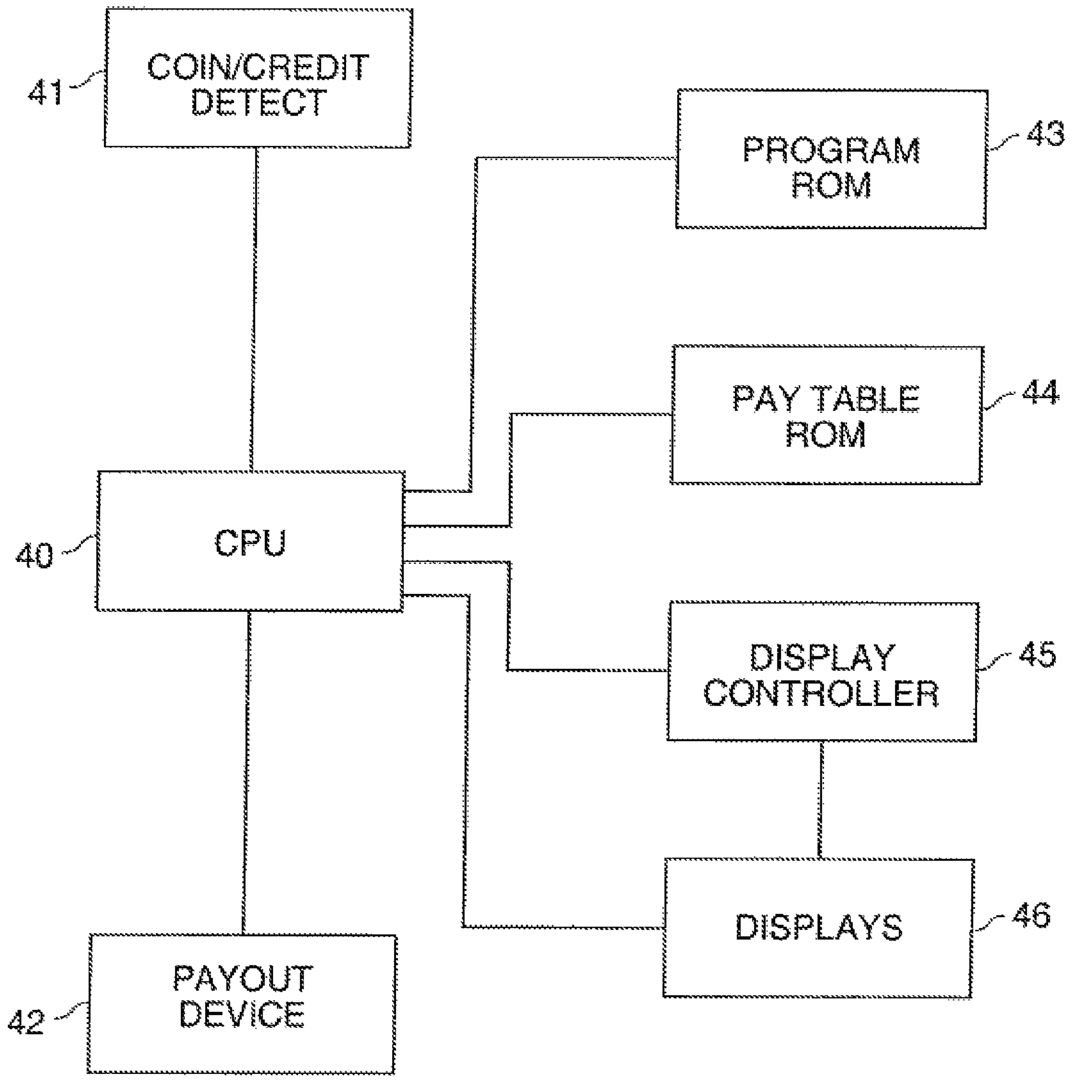
FIG. 2 is a block diagram showing the basic functional units in the gaming machine of FIG. 1.

FIG. 2 illustrates basic circuit blocks in a suitable gaming device. A control unit (CPU 40) runs a gaming program stored in a program ROM 43. The CPU 40 may represent a plurality of processors carrying out the game and controlling the peripheral devices, where the one or more processors are referred to as a computer. A coin/credit detector 41 enables the CPU 40 to initiate a next game. A pay table ROM 44 detects the outcome of the game and identifies awards to be paid to the player. A payout device 42 pays out an award to the player in the form of coins upon termination of the game or upon the player cashing out. A payout may also be in the form of a coded paper ticket, credits on a smart card or magnetic strip card, or in any other form. The payout device 42 may also be an optical reader for reading the Keno ticket and printing a validation ticket. A display controller 45 receives commands from the CPU 40 and generates signals for the various displays 46. If a display 46 is a touch screen, player commands may be input through the display screen into the CPU 40.

In one embodiment, the game is a Keno type bonus game that is initiated upon a special outcome of the main game displayed on machine 10 in FIG. 1. The main game may be the video simulation of motor-driven reels, where combinations of symbols across one or more pay lines are associated with awards to be granted to the player. Some symbol combinations pay credits as an award, and one or more other symbol combinations also trigger the bonus game. Such triggering events activating the bonus game may also be based on a random event or on any other criteria. Initiating a bonus game in a gaming machine is well known, and the software used to initialize the bonus game may be conventional. The gaming machine 10 may also be programmed so that the Keno game, along with the inventive secondary game, is the main game played.

The flowchart of FIG. 3 will be described with reference to the screen displays of FIGS. 5-8, which may be displayed on display 12 or 14 in FIG. 1. Alternatively, the display may be large for viewing by all the players in a room. Although numbers are used in the embodiments, any symbols may be displayed in the grid.

Figures 3, 4:
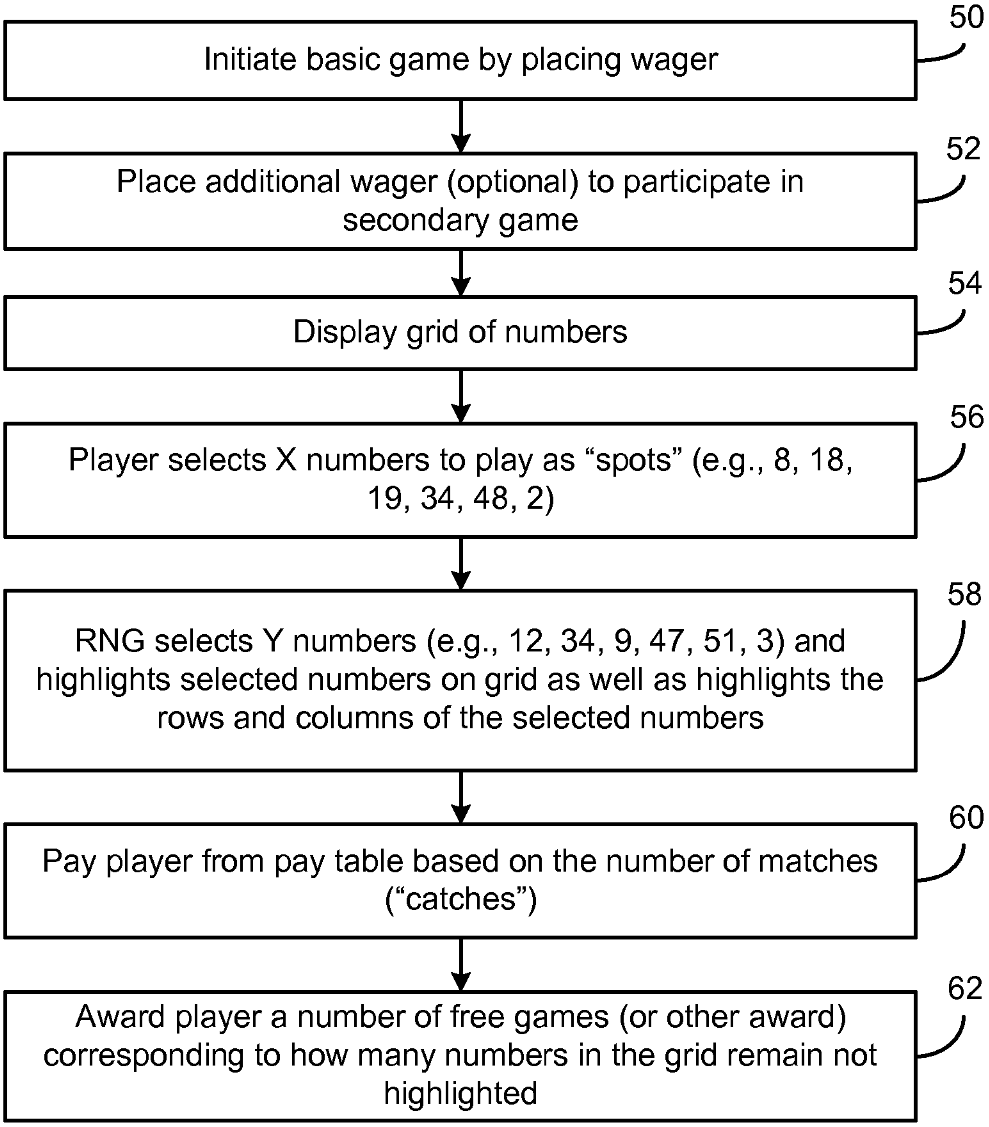
FIG. 3 is a flowchart of one embodiment of the invention played as a secondary game during a conventional Keno game.
FIG. 4 illustrates one type of pay table for the underlying Keno game.

In step 50 of FIG. 3, the player initiates the basic game by placing a wager. Such basic game may be a Keno type game. Alternatively, the basic game may be a conventional slot machine game, where the invention occurs during a bonus game.

In step 52, the player may be prompted to place an additional wager to participate in the secondary game. In one embodiment, the additional wager is equal to the wager for playing the base game. Placing an additional wager is optional in some embodiments; however, since the secondary game gives the player additional chances to win, the casino needs some means of recouping the awards granted in the secondary game.

Figure 5:
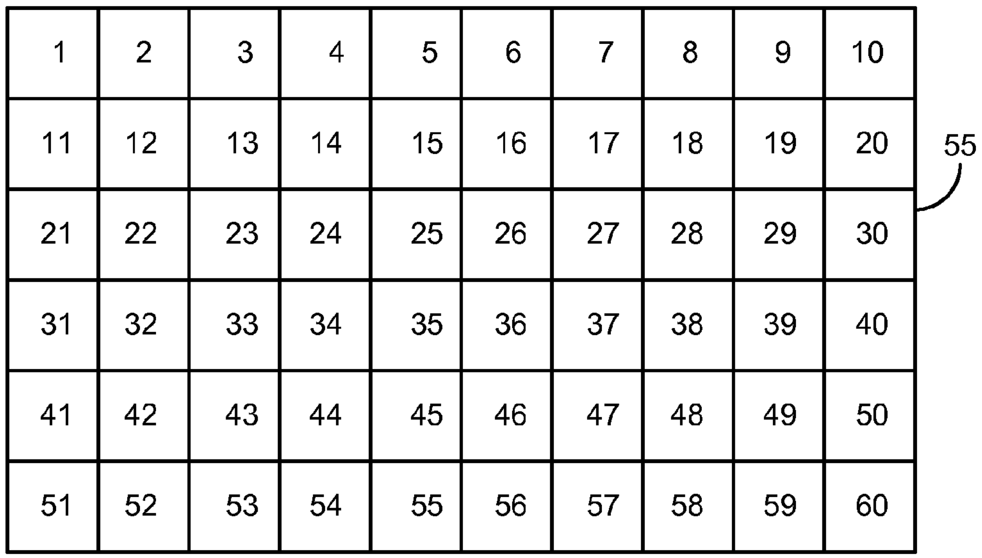
FIGS. 5-8 illustrate a display of a Keno grid (using only 60 numbers for simplicity) and the progression of the Keno game and secondary game, where

In step 54, a grid of numbers is displayed to the player, such as the grid 55 shown in FIG. 5 consisting of a 6×10 grid of the numbers 1-60. This grid 55 may be displayed on the display 12 or 14 in FIG. 1 or on a large display screen. A conventional Keno game uses a grid of 1-80 numbers, and the grid 55 may represent such a conventional Keno grid.

In step 56, as in a conventional Keno game, the player is given the opportunity to select X numbers in the grid 55. In one embodiment, the player must select a predetermined number of numbers, such as six numbers. In other embodiments, the player may select a variable number of numbers, and one of a plurality of pay tables is used that corresponds to the number of numbers selected by the player and the player's wager. The player's selected numbers may be highlighted on the grid of FIG. 5 or listed separately on the screen. In one embodiment, the screen is a touchscreen, and the player selects the numbers by touching numbers on the grid 55 of FIG. 5. The player may use a mouse, joystick, keyboard or other means to enter the numbers. The player may also select numbers via a filled-in paper ticket that is read by an optical reader in the machine 10, as previously described. Multiple players may share the same grid 55, displayed on a large screen, and the players may select the numbers using filled out tickets, which may then be entered by a casino operator into a computer using an optical reader. In one embodiment, the ticket to be filled out resembles a small version of the grid 55 of FIG. 5, where the players block out selected numbers with a pencil or other type of identifier, and the markings are optically read by a scanner.

Figure 6:
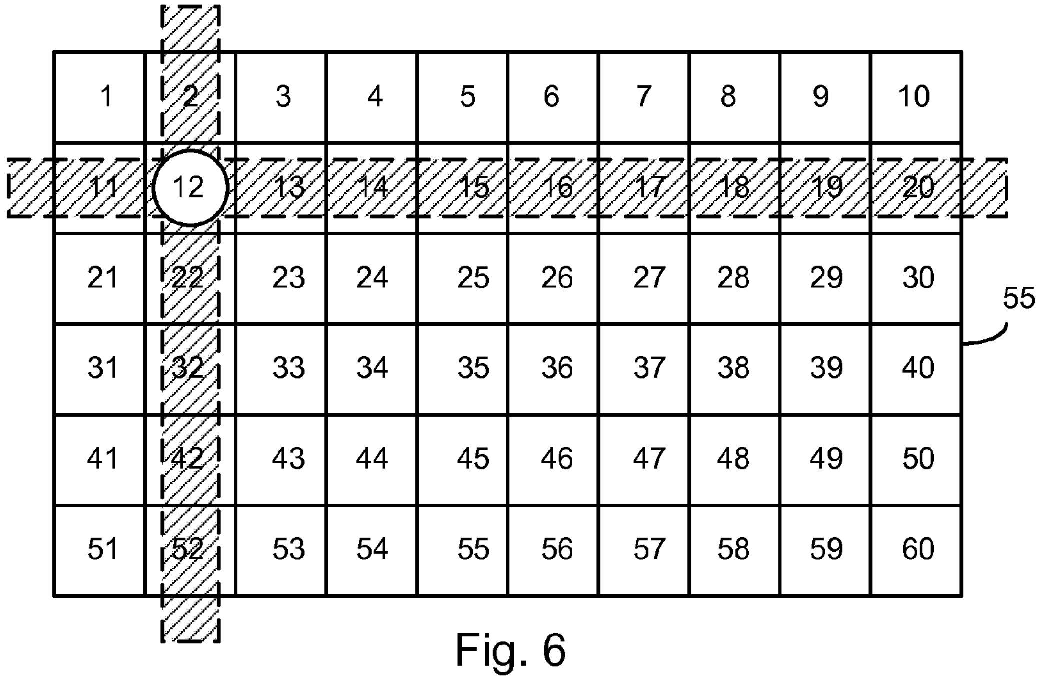

In step 58, the CPU 40 in FIG. 2, programmed as a random number generator, sequentially selects a predetermined number of numbers, such as the numbers 12, 34, 9, 47, 51, and 3. FIG. 6 illustrate the grid 55 after the number 12 is selected, where the number 12 is specially highlighted with a circle for purposes of the underlying Keno game, and the row and column in which the number 12 is located are also highlighted (or otherwise identified) for the secondary game. All the numbers in the highlighted row and column are rendered valueless in the secondary game. The random number generator may instead be a mechanical device, such as a machine that automatically selects different numbered balls from a ball container.

Figure 7:
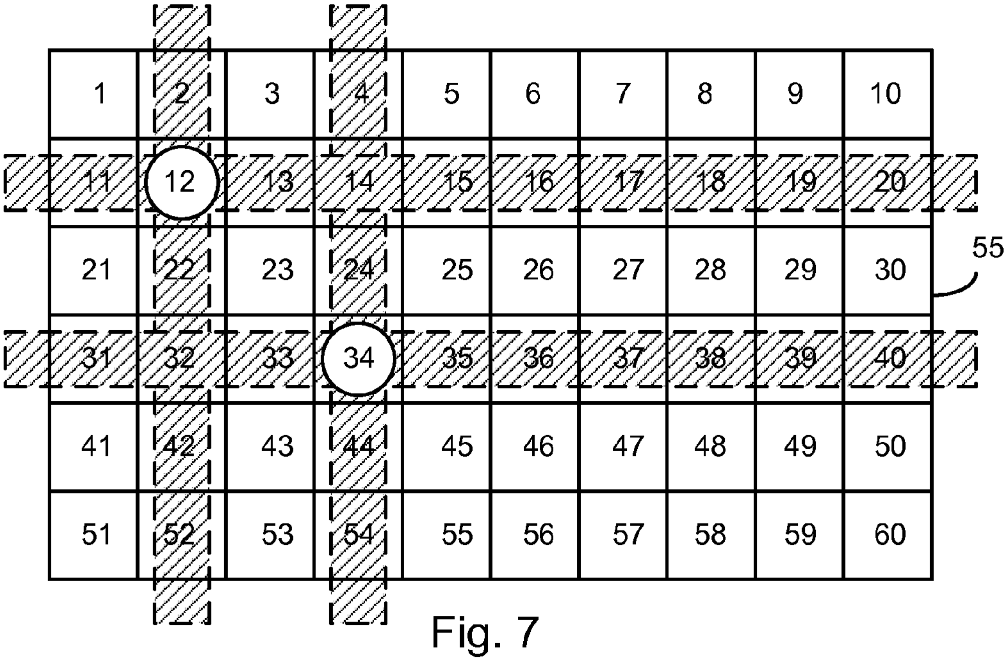

FIG. 7 illustrates the grid 55 after the number 34 is selected. As seen, the rows and columns get quickly highlighted when the numbers are on different rows and columns.

Figure 8:
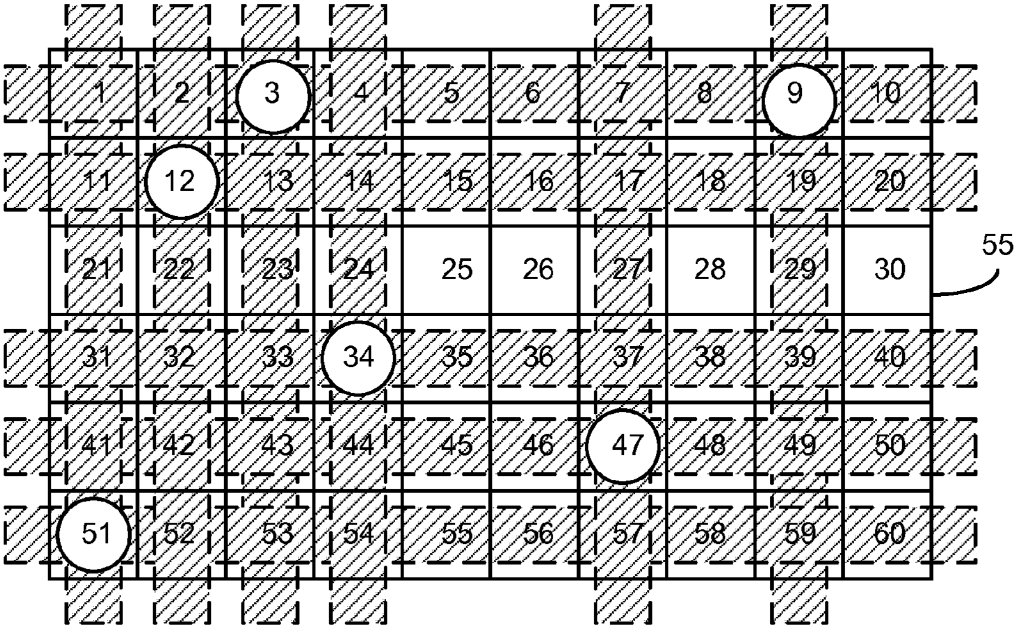

FIG. 8 illustrates the grid 55 after the six numbers 12, 34, 9, 47, 51, and 3 are randomly selected. At this point, the underlying Keno game is over and the player wins an award based on the number of matches ("catches") between the player's selection and the random selection, as shown in step 60. FIG. 4 is a sample pay table for a game where the player only selects six numbers and the random number generator only selects six numbers. As seen from FIG. 4, the awards can get very high for only a small bet.

FIG. 8 illustrates that only the numbers 25, 26, 28, and 30 were not highlighted during the secondary game. In one embodiment, the player is rewarded with one free game for each number not highlighted at the end of the Keno game, so the player wins four free games, as shown in step 62. Each free game is played assuming the player bet the same wager as the last paid game, and the same numbers are selected by the player. In another embodiment, the player wins a monetary amount based on the number of non-highlighted numbers. In another embodiment, the player wins the same bonus amount as long as there is at least one non-highlighted number remaining. In another embodiment, the number of non-highlighted numbers corresponds to a multiplier of the base award, or the base award is just doubled if there is at least one non-highlighted number remaining. In one embodiment, there must be a certain number of highlighted numbers remaining for the player to win an award in the secondary game. The mathematics of the secondary game award should be such that the casino breaks even or receives a small percentage of the additional wager.

In one embodiment, the main game itself is the highlighting of the rows and columns, so the "secondary game" described above is the main game, and awards are granted proportional to the number of non-highlighted numbers remaining after a certain number of random numbers are selected. The game may be played as a bonus game, where the gaming machine's computer automatically selects a certain number of grid positions in sequence, and a display shows the progressive highlighting of the rows and columns until the game is over. The player wins based on the grid positions not highlighted. The bonus game may be initiated upon the main game causing a bonus game trigger event, such as a special combination of symbols across a payline in a conventional slot machine game using three or more virtual reels.

In one embodiment, the particular symbol in the non-highlighted grid position conveys the award to the player, such as a monetary award. For example, in the grid of FIG. 8, the player may win credits equal to the number of the grid position, although in a preferred embodiment of such a game the award amounts would be randomly distributed around the grid to avoid a row of high-paying awards remaining. The symbols may also convey a multiplier of the Keno game award.

The grid 55 may be any size, and the size of the grid affects the odds of winning the secondary game.

In one embodiment, during a free game, the player may win additional free games if there are non-highlighted numbers at the end of a free game.

In another embodiment, a standard Keno grid is not used, so all embodiments of the game cannot be considered a secondary game of a Keno game. In another embodiment, the game may be considered a lottery game.

In one embodiment, instead of rows and columns being highlighted, only the grid locations immediately surrounding the randomly selected number are highlighted. Alternatively, only diagonal grid positions are highlighted, or only the columns next to the selected number are highlighted, or only the rows next to the selected number are highlighted, or only the column containing the selected number is highlighted, or only the row containing the selected number is highlighted, or other particular shapes in the grid are highlighted after each random selection of a number. Any size grid may be used, such as 3×3, 5×5, 5×10, 8×10, etc. In one embodiment, the grid is not rectangular but may be triangular, a diamond, a star, or other shape, and symbols (e.g., numbers) may be highlighted in any pattern such as rows, columns, only adjacent symbols, only diagonal symbols, etc.

Figure 9:
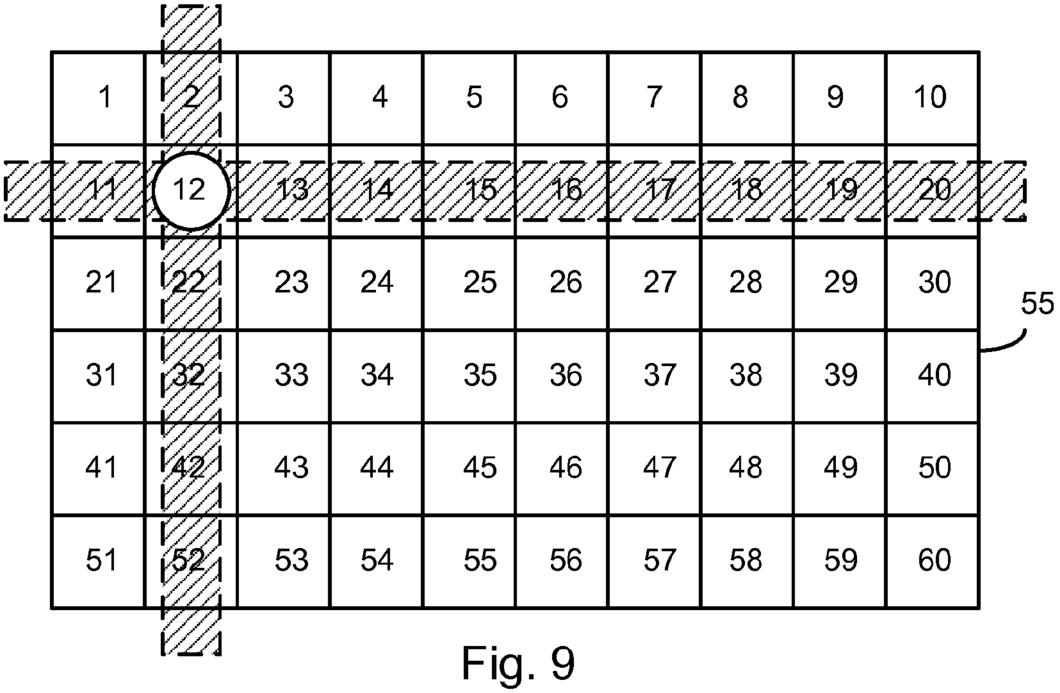
FIGS. 9-11 illustrate the Keno game of FIGS. 5-8 but with a different embodiment of the secondary game where, when a number is highlighted an even number of times, the highlight over that number disappears to reactivate the number.
Figure 10:
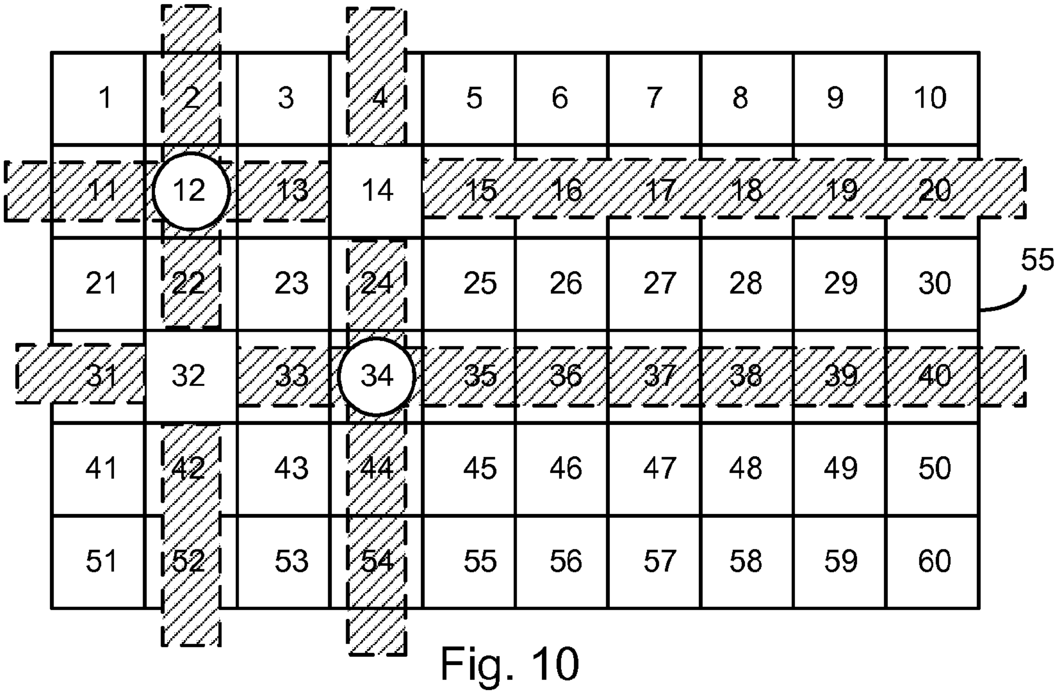
Figure 11:
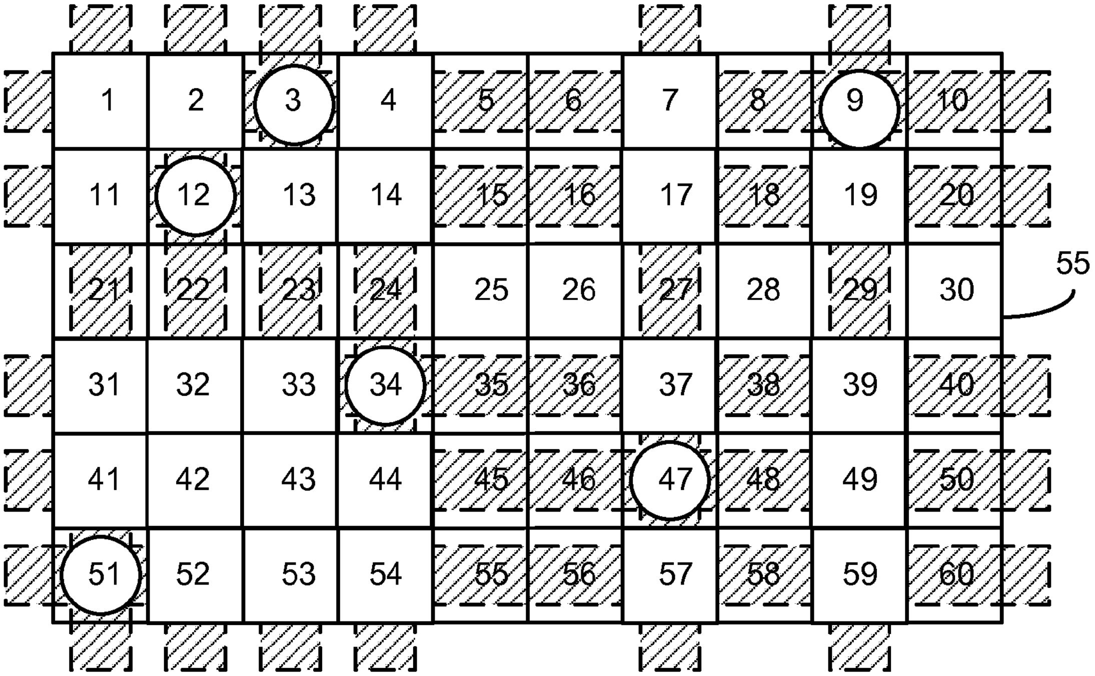

FIGS. 9-11 illustrate the Keno game of FIGS. 5-8 but with a different embodiment of the secondary game where, when a number is highlighted an even number of times, the highlight over that number disappears to reactivate the number. All the other features and variations of the secondary game described above are also applicable to the game variation of FIGS. 9-11.

FIG. 9 is identical to FIG. 6 and illustrates the grid 55 after the number 12 has been randomly selected in the Keno game and the row and column containing 12 have been highlighted in the secondary game.

FIG. 10 illustrates that the number 34 has been randomly selected in the Keno game and the row and column containing 34 have been highlighted in the secondary game. Note in this variation, the numbers 14 and 32 have been un-highlighted due to the overlapping highlights, so 14 and 32 have been reactivated for the secondary game.

FIG. 11 illustrates the grid 55 after the same six Keno numbers have been selected as selected in the grid 55 of FIG. 8. Since an overlapping highlight cancels the highlight, many numbers have been reactivated, so the secondary game can progress without filling up the grid 55 with highlights. If a number has been highlighted an odd number of times, the highlight will remain over the number. This allows new award possibilities to be created with every Keno number selection, and the grid 55 will most likely not fill up with highlights even after 20 Keno numbers are selected, which is a common amount of Keno numbers randomly selected.

In the embodiment of FIGS. 9-11, an award of one free game for each highlighted number would be impractical, so some fraction of a free game or a small award may be granted for each non-highlighted number after the Keno game. The game of FIGS. 9-11 also makes it practical to grant higher awards for patterns of non-highlighted numbers, such as 3×3 blocks of numbers (or larger blocks), or an entire row or column of non-highlighted numbers, etc. Different awards may be granted if the number of highlighted numbers or non-highlighted numbers exceed certain thresholds. Many more award possibilities are practical with the game of FIGS. 9-11.

The game may be played on a stand-alone machine or system, or on a machine connected to a server, or on-line via the Internet, or on any device having a display and a processor, such as a cell telephone. All such devices may be considered gaming machines, gaming terminals, or gaming devices. An award, other than free games, may be paid via coins, a printed ticket, incrementing an account, or any other suitable way.

The term "random" as used herein includes random and pseudorandom. The term "highlight" means any visual method that draws attention to a row or number due to a number being randomly selected in the underlying Keno game.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a gaming system, the gaming system having a player input device, comprising:

a. displaying an M row×N column grid of different numbers;

b. receiving selection information from the player input device, by a player making number selections using the player input device, identifying a plurality of numbers in the grid of different numbers;

c. randomly selecting a plurality of numbers in the grid of different numbers by a random number generator (RNG) and indicating the randomly selected numbers on the grid;

d. as part of a secondary game, for each number randomly selected by the RNG, visually identifying the row and column of the randomly selected number;

e. after the plurality of numbers have been randomly selected by the RNG, granting the player a first award based on matches between numbers that the player selected via the player input device and the random numbers selected by the RNG; and f. as part of the secondary game, granting a second award to the player based on one or more numbers not being at locations in the grid visually identified, pursuant to step d, after the plurality of numbers have been randomly selected by the RNG.

2. The method of claim 1 wherein the player input device is a touch screen, and wherein step b comprises receiving selection signals by the player touching numbers in the grid.

3. The method of claim 1 wherein the player input device is an electronic reader that reads a ticket filled in by the player, and wherein step b comprises receiving selection information by the ticket being read by the electronic reader.

4. The method of claim 1 wherein steps a-e comprise Keno, where step f does not affect the Keno game.

5. The method of claim 1 wherein the second award is at least one of free games, monetary awards, or a multiplier of the first award.

6. The method of claim 1 wherein step a comprises displaying an M row×N column grid of different numbers on a display screen in a gaming terminal, and wherein step b comprises receiving electronic selection signals from the player input device forming part of the gaming terminal.

7. The method of claim 1 wherein step a comprises displaying a grid of 80 numbers in an 8×10 matrix.

8. The method of claim 1 wherein step d comprises highlighting in the grid all numbers in the same row and column as the number selected by the RNG.

9. The method of claim 1 wherein the second award increases depending on the number of numbers not being in the same row and column as any number randomly selected by the RNG after the plurality of numbers have been randomly selected by the RNG.

10. The method of claim 1 wherein the second award comprises one free game for each number not being in the same row and column as any number randomly selected by the RNG after the plurality of numbers have been randomly selected by the RNG.

11. The method of claim 1 further comprising the step of receiving a first wager by the gaming system for playing the game of steps a-e and receiving a second wager for participating in step f.

12. The method of claim 1 wherein step a comprises displaying an M row×N column grid of different numbers on a display for viewing by a plurality of different players playing the same game.

13. The method of claim 1 wherein visually identifying the row and column of the randomly selected number in step d comprises highlighting numbers in the row and column in the grid.

14. The method of claim 13 wherein granting the second award in step f comprises granting the second award based on one or more numbers not being highlighted after the plurality of numbers have been randomly selected by the RNG.

15. The method of claim 13 wherein step d further comprises un-highlighting a previously highlighted number if that number is again in a row or column of a number randomly selected in step c.

16. The system of claim 13 wherein the second award increases depending on the number of numbers not being in the same row and column as any number randomly selected by the at least one programmed processor after the plurality of numbers have been randomly selected by the at least one programmed processor.

17. The method of claim 15 wherein granting the second award in step f comprises granting the second award based on one or more numbers not being highlighted after the plurality of numbers have been randomly selected by the RNG.

18. An electronically controlled gaming system comprising:

a display screen;

a player input device;

at least one programmed processor for carrying out the method comprising:

a. displaying an M row×N column grid of different numbers on the display screen;

b. receiving selection signals from the player input device, by a player making selections using the player input device, identifying a plurality of numbers in the grid of different numbers;

c. randomly selecting by the at least one programmed processor a plurality of numbers in the grid of different numbers and indicating the randomly selected numbers on the grid;

d. as part of a secondary game, for each number randomly selected by the at least one programmed processor, visually identifying the row and column of the randomly selected number;

e. after the plurality of numbers have been randomly selected by the at least one programmed processor, granting the player a first award based on matches between numbers that the player selected via the player input device and the random numbers selected by the at least one programmed processor; and f. as part of the secondary game, granting a second award to the player based on one or more numbers not being at locations in the grid visually identified, pursuant to step d, after the plurality of numbers have been randomly selected by the at least one programmed processor.

19. The system of claim 18 wherein steps a-e comprises Keno, wherein step f does not affect the Keno game.

20. The system of claim 18 wherein the second award is at least one of free games, monetary awards, or a multiplier of the first award.

21. The system of claim 18 wherein step a comprises displaying a grid of 80 numbers in an 8×10 matrix.

22. The system of claim 18 wherein the second award comprises one free game for each number not being in the same row and column as any number randomly selected by the at least one programmed processor after the plurality of numbers have been randomly selected by the at least one programmed processor.

23. The system of claim 18 wherein the player input device is a touch screen, and wherein step b comprises receiving selection signals by the player touching numbers in the grid.

24. The system of claim 18 wherein the player input device is an electronic reader that reads a ticket filled in by the player, and wherein step b comprises receiving selection information by the ticket being read by the electronic reader.

25. The system of claim 18 wherein visually identifying the row and column of the randomly selected number in step d comprises highlighting numbers in the row and column in the grid.

26. The system of claim 25 wherein granting the second award in step f comprises granting the second award based on one or more numbers not being highlighted after the plurality of numbers have been randomly selected by the at least one programmed processor.

27. The system of claim 25 wherein step d further comprises un-highlighting a previously highlighted number if that number is again in a row or column of a number randomly selected in step c.

28. The system of claim 27 wherein granting the second award in step f comprises granting the second award based on one or more numbers not being highlighted after the plurality of numbers have been randomly selected by the at least one programmed processor.

29. A gaming method comprising:

receiving a payment from a player by a payment detector for playing a game;

displaying an array of different symbols;

randomly selecting by a computer a plurality of symbols in the array of different symbols;

for each symbol randomly selected by the computer, visually identifying symbols in a predetermined pattern in the array based on a location of the selected symbol; and after the plurality of symbols have been randomly selected by the computer, granting an award for at least one symbol in the array not being identified in the predetermined pattern for each of the selected symbols after the plurality of symbols have been randomly selected by the computer.

30. The method of claim 29 wherein the array of different symbols is a rectangular M row×N column grid of different symbols, and wherein identifying symbols in a predetermined pattern comprises identifying symbols in a same row and column in the grid as the selected symbol.

31. The method of claim 29 wherein the award increases depending on the number of symbols not being identified in the predetermined pattern after the plurality of symbols have been randomly selected by the computer.

32. The method of claim 29 wherein the award is based upon an identity of each symbol in the array not being identified in the predetermined pattern after the plurality of symbols have been randomly selected by the computer.

33. The method of claim 29 wherein the game comprises a bonus game in a gaming machine, wherein receiving a payment from a player by a payment detector for playing a game comprises receiving the payment for playing a main game on the gaming machine, and wherein the steps of displaying the array of different symbols, randomly selecting the plurality of symbols, identifying symbols in a predetermined pattern, and granting the award are steps performed during a bonus game after a trigger event during the main game.

34. The method of claim 29 wherein visually identifying symbols in a predetermined pattern in the array comprises highlighting symbols in the particular pattern.

35. The method of claim 34 wherein granting the award comprises granting the award based on one or more symbols not being highlighted after the plurality of symbols have been randomly selected.

36. The method of claim 34 further comprising un-highlighting a previously highlighted symbol if that symbol is again in the particular pattern due to another symbol being randomly selected.

37. The method of claim 36 wherein granting the award comprises granting the award based on one or more symbols not being highlighted after the plurality of symbols have been randomly selected.

* * * * *